United States Patent
Morimoto et al.

[11] Patent Number: 5,905,851
[45] Date of Patent: May 18, 1999

[54] LIGHT BEAM SCANNING RECORDING DEVICE

[75] Inventors: Yoshinori Morimoto; Yoshiharu Okino; Atsushi Uejima; Toshiyuki Inoue; Kenichi Kodama, all of Kanagawa-ken, Japan

[73] Assignee: Fuji Photo Film Co., Ltd., Kanagawa-ken, Japan

[21] Appl. No.: 08/653,340

[22] Filed: May 24, 1996

[30] Foreign Application Priority Data

May 25, 1995 [JP] Japan .................................. 7-126553

[51] Int. Cl.$^6$ .............................. G06F 15/00; H04N 1/21; H04N 1/04; B41J 2/00
[52] U.S. Cl. .................... 395/104; 395/112; 358/296; 358/475; 347/232; 347/233
[58] Field of Search .................... 358/296, 475, 358/401, 402, 474, 472, 493, 494, 510, 509, 514, 512; 395/105, 107, 109, 104, 112; 346/107.1, 107.3; 347/243, 259, 260, 232, 233, 238

[56] References Cited

U.S. PATENT DOCUMENTS

| | | | |
|---|---|---|---|
| 4,821,113 | 4/1989 | McQuade et al. | 358/298 |
| 4,862,196 | 8/1989 | Umeda et al. | 358/296 |
| 4,866,512 | 9/1989 | Hirosawa et al. | 358/512 |
| 4,918,465 | 4/1990 | Morita | 347/232 |
| 4,924,321 | 5/1990 | Miyagawa et al. | 359/296 |
| 4,962,312 | 10/1990 | Matuura et al. | 346/232 |
| 5,008,686 | 4/1991 | Saito | 346/108 |
| 5,055,921 | 10/1991 | Usui | 347/232 |
| 5,121,137 | 6/1992 | Taki et al. | 347/232 |
| 5,170,180 | 12/1992 | Doi | 347/232 |
| 5,251,055 | 10/1993 | Koide | 347/232 |
| 5,461,602 | 10/1995 | Moriya et al. | 369/116 |
| 5,485,194 | 1/1996 | Tateoka | 347/232 |
| 5,563,647 | 10/1996 | Fisii | 347/232 |

*Primary Examiner*—Edward L. Coles
*Assistant Examiner*—Mark Wallerson
*Attorney, Agent, or Firm*—Sughrue, Mion, Zinn, Macpeak & Seas, PLLC

[57] ABSTRACT

In a light beam scanning recording device, a color image is recorded on a recording material by scanning the recording material in a main scanning direction and a sub-scanning direction with light beams of three different wavelengths modulated according to an image signal. A light source which emits a plurality of light beams which form a predetermined number of beam spots on the recording material arranged in the sub-scanning direction is used as the light source for emitting light beams of each wavelength, whereby recording is effected simultaneously along the predetermined number of main scanning lines.

10 Claims, 8 Drawing Sheets

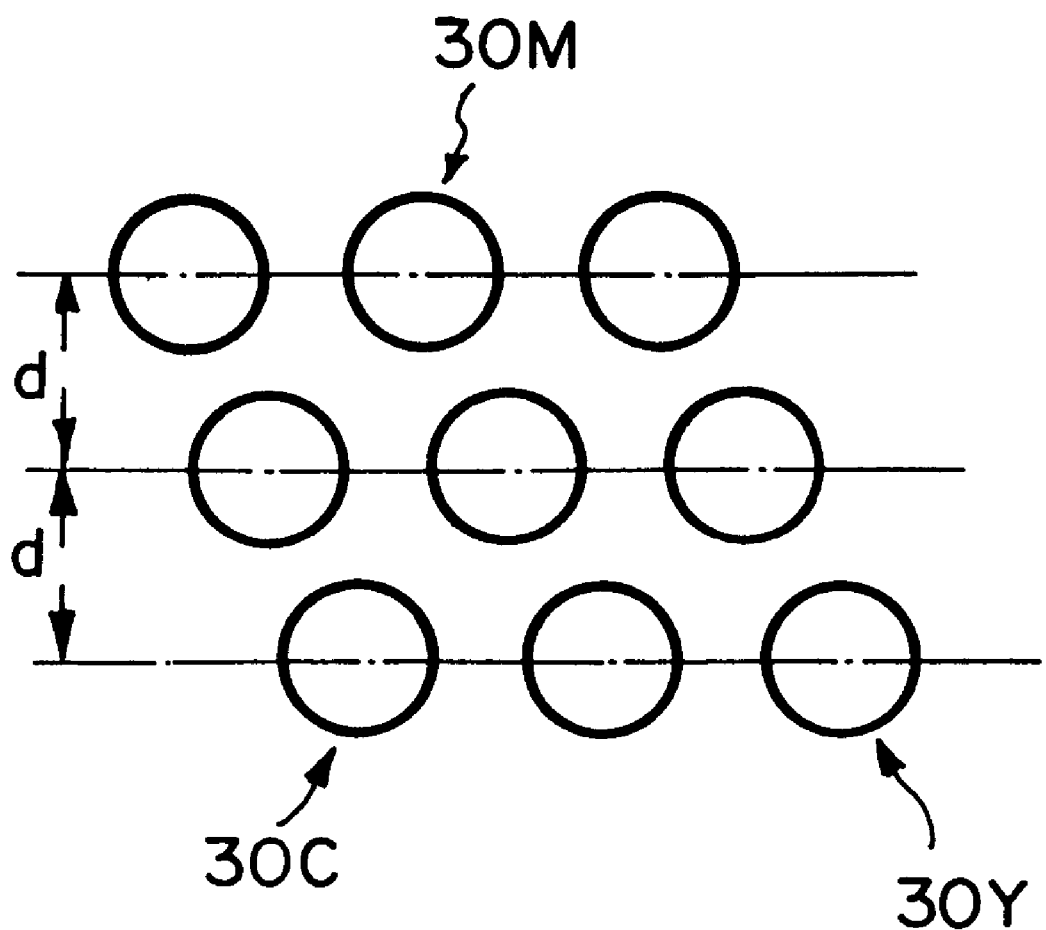

ically scanning a recording material with light beams of a plurality of different wavelengths modulated according to information to be recorded, and more particularly to a light beam scanning recording system in which recording is effected simultaneously along a plurality of main scanning lines.

LIGHT BEAM SCANNING RECORDING DEVICE

BACKGROUND OF THE INVENTION

1. Field of the Invention

This invention relates to a light beam scanning recording device which records a color image by two-dimensionally scanning a recording material with light beams of a plurality of different wavelengths modulated according to information to be recorded, and more particularly to a light beam scanning recording system in which recording is effected simultaneously along a plurality of main scanning lines.

2. Description of the Related Art

There have been known various light beam scanning recording devices in which a color image is recorded on a recording material by modulating light beams of a plurality of different wavelengths according to an image signal and scanning the recording material in a main scanning direction and a sub scanning direction with the modulated light beams.

In such light beam scanning recording devices, each recording light beam is modulated by directly modulating a semiconductor laser which is used as a light source or by use of an external light modulator such as an acoustooptic modulator or an optoelectronic modulator, and intensity modulation, pulse width modulation or pulse number modulation is generally employed.

In order to record a high quality image at a high speed using such light beam scanning recording devices, it is necessary to increase the amount of light projected onto each picture element and widen the dynamic range. Such a requirement can be met by using a light source of a high output power and setting long the recording time for one picture element so that the pulse width and/or the pulse number can be modulated over a wide range.

However, increase in output power of the recording light source is inherently limited and especially when a semiconductor laser is used, the output power of the laser cannot be satisfactory. Further attempts have been made to increase the amount of light projected onto each picture element by combining light beams emitted from a plurality of semiconductor lasers into a single beam. However this approach is disadvantageous in that there is required a combining optical system which must be highly accurate in alignment, which adds to cost of the device.

On the other hand, when the recording time for one picture element is set long, the recording speed lowers.

SUMMARY OF THE INVENTION

In view of the foregoing observations and description, the primary object of the present invention is to provide a light beam scanning recording device which can record a high quality color image at a high speed, and at the same time can be manufactured at low cost.

The light beam scanning recording device of the present invention is for recording a color image by scanning a recording material in a main scanning direction and a sub-scanning direction with light beams of a plurality of different wavelengths modulated according to an image signal and is characterized in that a light source which emits a plurality of light beams which form a predetermined number of beam spots on the recording material arranged in the sub-scanning direction is used as the light source for emitting light beams of each wavelength so that recording is effected simultaneously along the predetermined number of main scanning lines.

When recording is effected simultaneously along a plurality of main scanning lines, a high speed recording can be realized even if the main scanning speed is low. When the main scanning speed is low, the recording time for one picture element can be set long, whereby the amount of light applied to each picture element can be increased and the dynamic range can be widened so that a high quality color image can be recorded.

Further when the main scanning speed is low, the light deflector such as a polygonal mirror for causing the light beams to scan the recording material in the main scanning direction need not be driven at a high speed and at the same time the modulator need not respond at a high speed, which makes it feasible to manufacture the laser beam scanning recording device at relatively low cost.

Further the light beam scanning recording device of the present invention does not require a combining optical system such as described above and accordingly can be manufactured at relatively low cost.

BRIEF DESCRIPTION OF THE DRAWINGS

FIG. 11 is a schematic view for illustrating a modification of the light source.

DESCRIPTION OF THE PREFERRED EMBODIMENT

Figure 6:
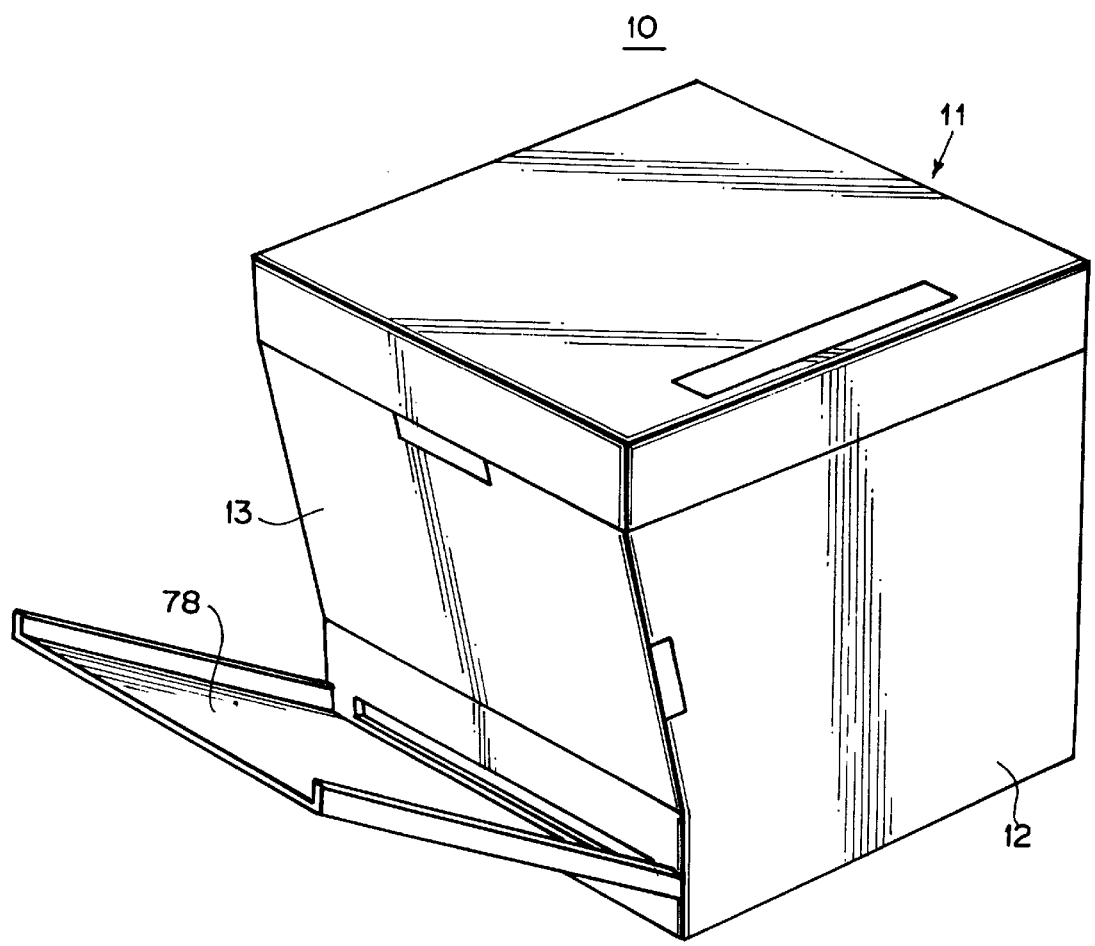
FIG. 6 is a perspective view showing the appearance of the light beam scanning recording device.

As shown in FIG. 6, a light beam scanning recording device 10 in accordance with an embodiment of the present invention has a box-like housing 11 provided with a front door 12 and a side door 13. When the doors 12 and 13 are opened, the structure in the housing 11 is exposed.

Figure 5:
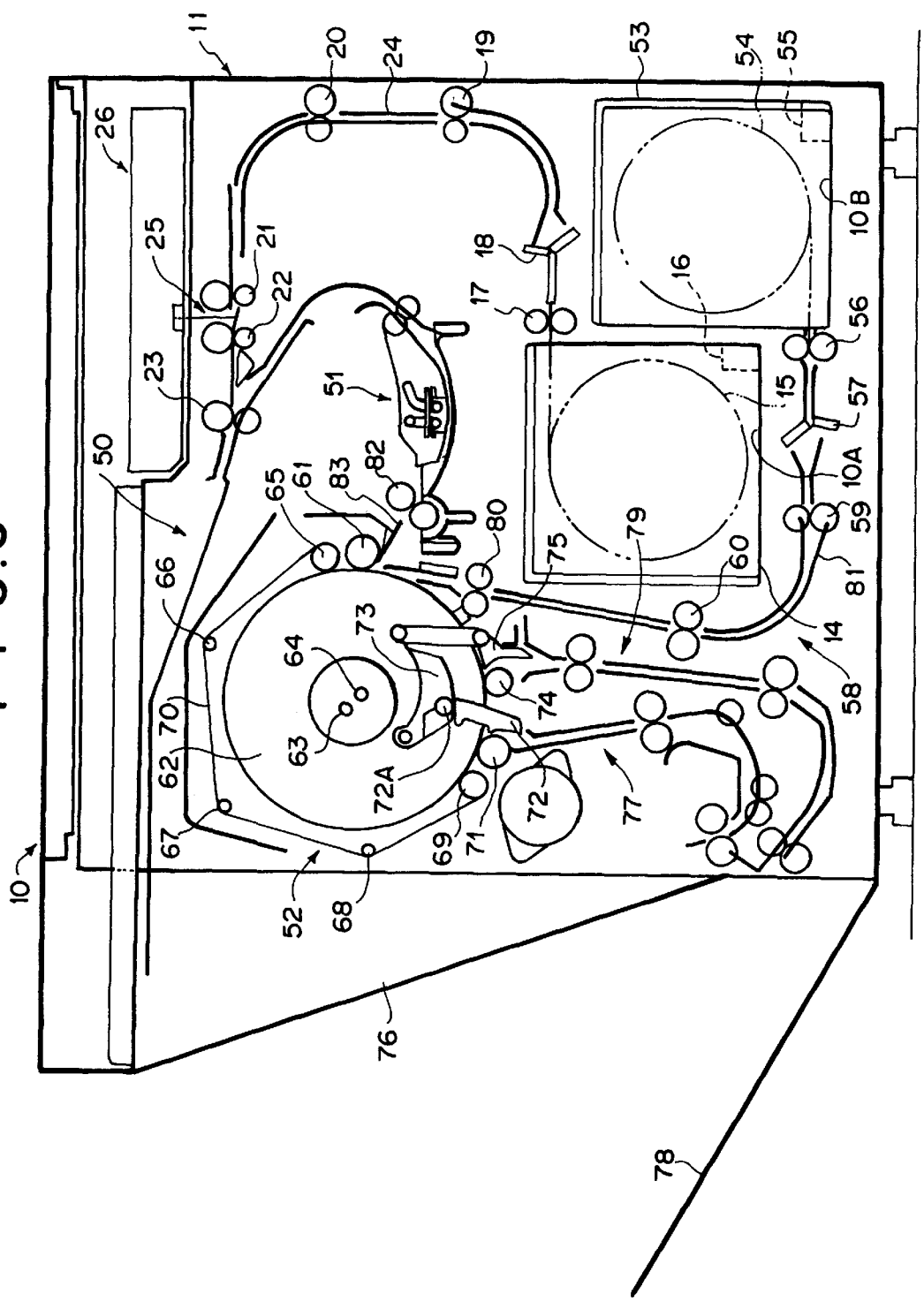
FIG. 5 is a front view of the light beam scanning recording device.

As shown in FIG. 5, a photosensitive material magazine 14 is loaded in the housing 11. A roll of a photosensitive material 15 is contained in the photosensitive material magazine 14. The photosensitive material 15 is drawn out from the magazine 14 at an upper part thereof with its photosensitive surface faced downward.

The magazine 14 is provided with a mark such as bar codes, a notch, a projection or the like according to the kind and/or lot of the photosensitive material 15 contained therein, and a photosensitive material sensor 16 provided in a magazine chamber 10A detects the mark. The photosensitive material sensor 16 is connected to a general control unit which controls the overall light beam scanning recording device 10 and the general control unit determines whether a photosensitive material magazine 14 has been loaded and the kind and the lot of the photosensitive material 15 contained in the magazine 14 on the basis of signals from the sensor 16.

A pair of nip rollers 17 and a cutter 18 are disposed near the exit slit of the magazine 14 and the photosensitive material 15 is drawn out from the magazine 14 by the nip rollers 17 and cut in a predetermined length by the cutter 18. A plurality of conveyor rollers 19 to 23 and a guide plate 24 are provided to convey the photosensitive material 15 cut in the predetermined length to an exposure station 25. The exposure station 25 is between the conveyor rollers 21 and 22 which serve as a sub-scanning means and the photosensitive material 15 is exposed to light when passing through the exposure station 25.

Figure 1:
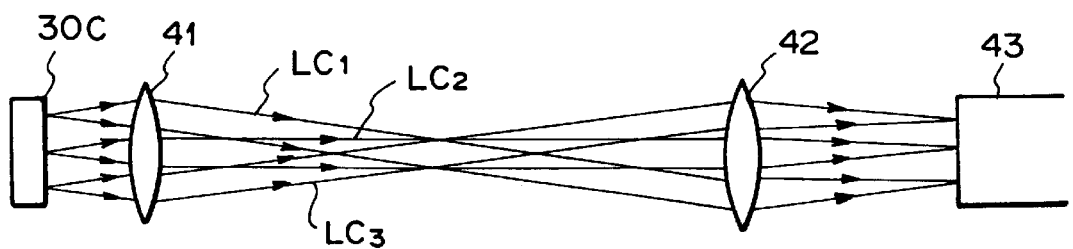
FIG. 1 is a side view showing an important part of the laser scanning unit in a light beam scanning recording device in accordance with an embodiment of the present invention.
Figure 2:
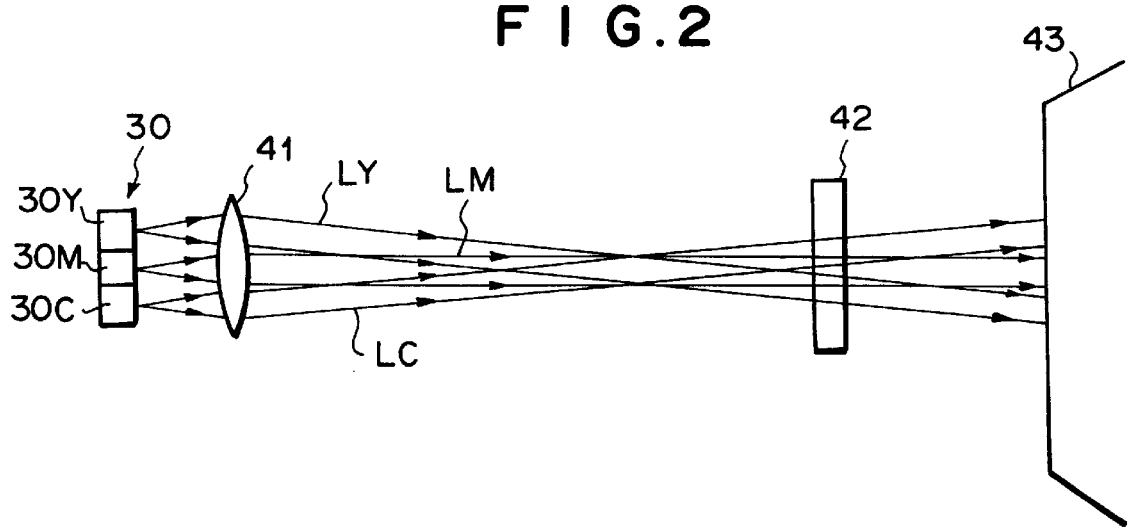
FIG. 2 is a plan view of the important part of the laser scanning unit.
Figure 3:
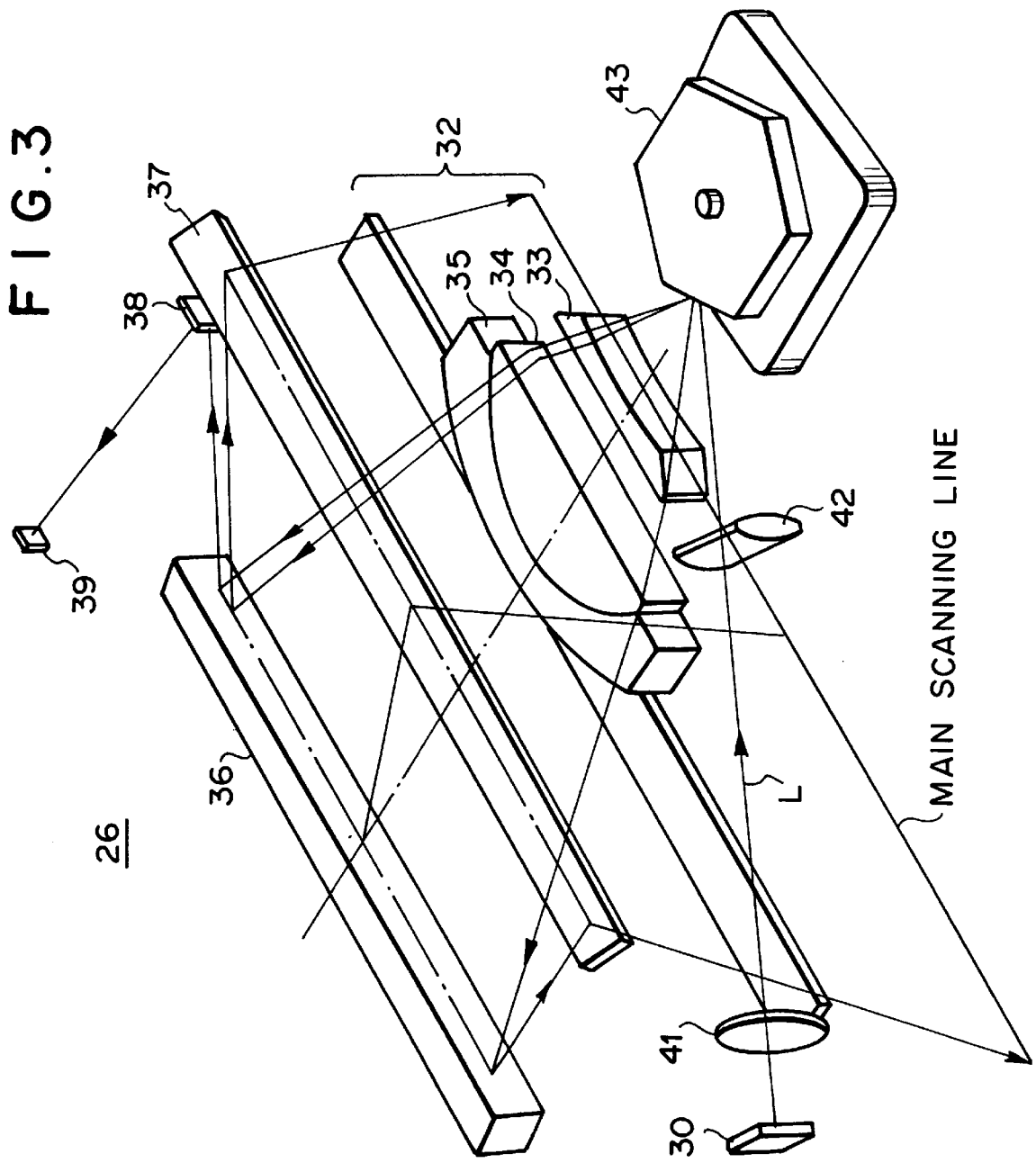
FIG. 3 is a perspective view of the laser scanning unit.
Figure 4:
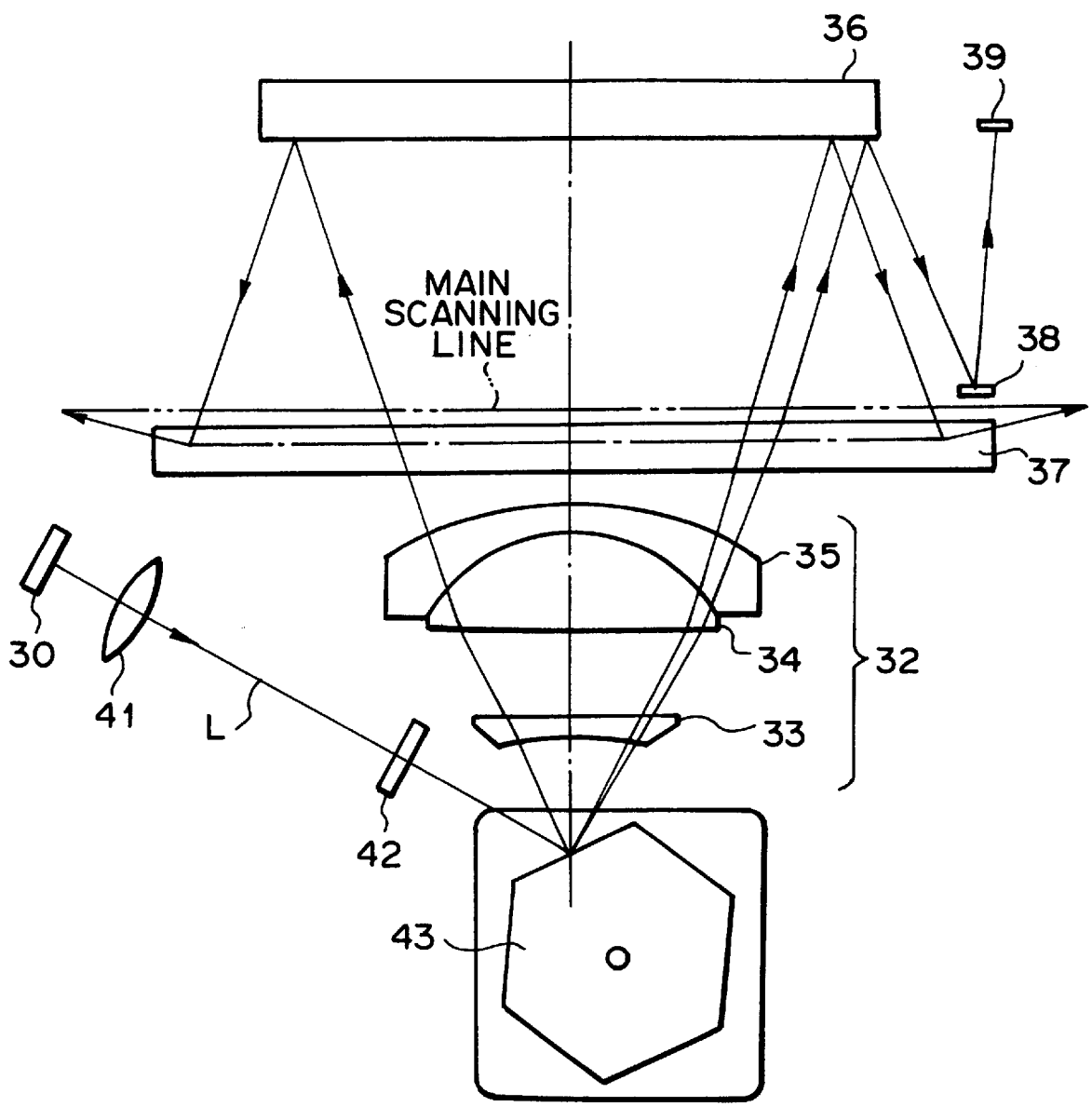
FIG. 4 is a plan view of the laser scanning unit.

A laser scanning unit 26 is disposed just above the exposure station 25. As shown in FIGS. 3 and 4, the laser scanning unit 26 has a light source 30 in the form of a two-dimensional laser diode array. Though the light source 30 emits a plurality of laser beams as will be described later, only a single laser beam L is shown in FIGS. 3 and 4 for the purpose of simplicity. The basic light beam scanning will be described on the laser beam L by way of example, hereinbelow.

A diverging laser beam L emitted from the light source 30 is collimated by a collimator lens 41 and condensed to converge only in a plane perpendicular to the surface of the paper on which FIG. 4 is drawn by a cylindrical lens 42. The laser beam L thus condensed impinges upon a polygonal mirror 43 to form a linear image on a deflecting surface of the polygonal mirror 43 and then deflected by the polygonal mirror 43, which is rotated, to enter an imaging optical system 32.

The imaging optical system 32 is an fθ lens comprising a concavo-plane lens 33, a plano-convex lens 34 and a concavo-convex lens 35. The laser beam L passing through the imaging optical system 32 is reflected by mirrors 36 and 37 to travel downward and is converged on the upper surface of the photosensitive material 15. The laser beam L scans the upper surface of the photosensitive material 15 in a main scanning direction perpendicular to the direction in which the photosensitive material 15 is conveyed (sub-scanning direction), that is, left and right in FIG. 4. The laser beam L is condensed by the imaging optical system 32 to converge on the surface of the photosensitive material 15 irrespective of the main scanning position.

Figure 8:
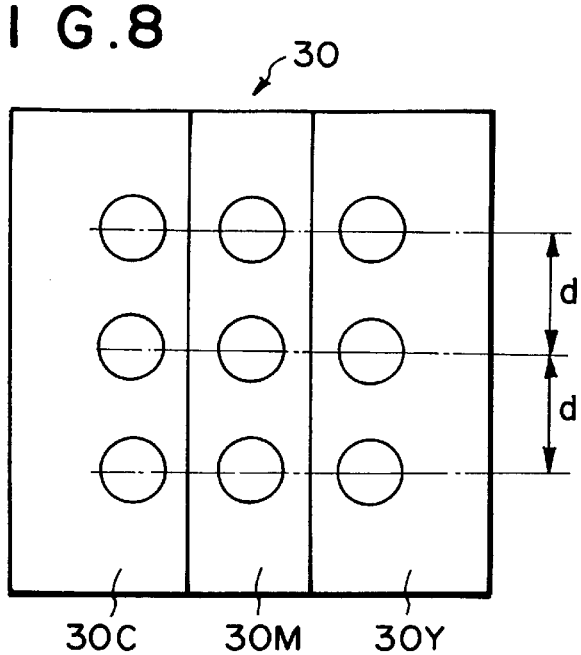
FIG. 8 is a front view of the light source employed in the light beam scanning recording device.

As shown in FIG. 8, the light source 30 comprises a laser diode array 30C which emit laser beams LC of, for instance, 750 nm for developing cyan, a laser diode array 30M which emit laser beams LM of, for instance, 680 nm for developing magenta, and a laser diode array 30Y which emit laser beams LY of, for instance, 810 nm for developing yellow which are combined together to form a two-dimensional array. As the laser diode arrays 30C, 30M and 30Y, surface-emitting laser diode arrays may be suitably employed.

Figure 9:
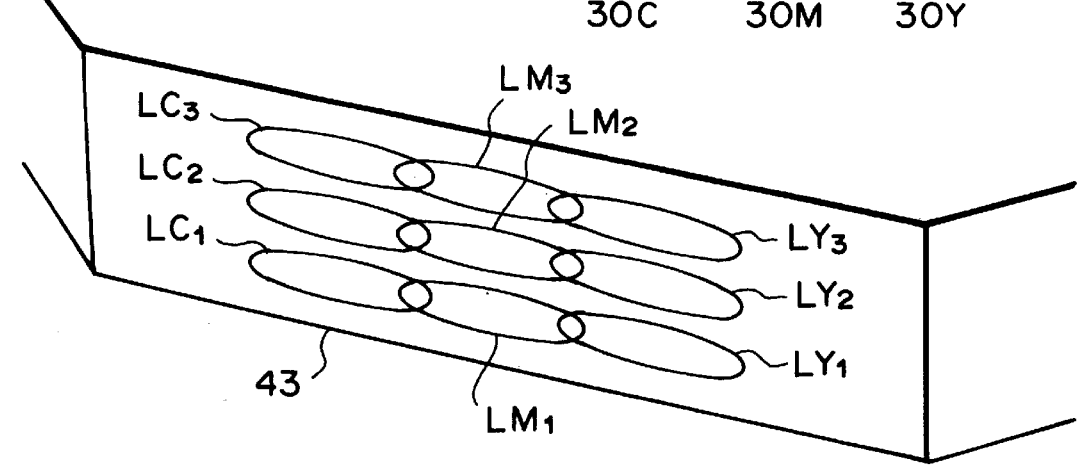
FIG. 9 is a schematic view for illustrating travel of the light beams in the light beam scanning recording device.

Each of the laser diode arrays 30C, 30M and 30Y comprises, for instance, three laser diodes linearly arranged at predetermined pitches. Laser beams LC1, LC2 and LC3 emitted from the laser diode array 30C, laser beams LM1, LM2 and LM3 emitted from the laser diode array 30M and laser beams LY1, LY2 and LY3 emitted from the laser diode array 30Y impinge upon the deflecting surface of the polygonal mirror 43 in the state shown in FIG. 9. That is, the laser beams LC1, LM1 and LY1 (LC2, LM2 and LY2, LC3, LM3 and LY3) of different wavelengths are positioned side by side in the direction of rotation of the polygonal mirror 43 while the laser beams LC1, LC2 and LC3 (LM1, LM2 and LM3, LY1, LY2 and LY3) of the same wavelengths are positioned side by side in a direction parallel to the rotational axis of the polygonal mirror 43.

Accordingly, the photosensitive material 15 is scanned along three main scanning lines per one main scanning period each by three laser beams (LC1, LM1 and LY1) or (LC2, LM2 and LY2) or (LC3, LM3 and LY3) of different wavelengths. Each set of the laser beams LC, LM and LY may be converged on three points positioned side by side along one main scanning line or on one point.

Figure 10:
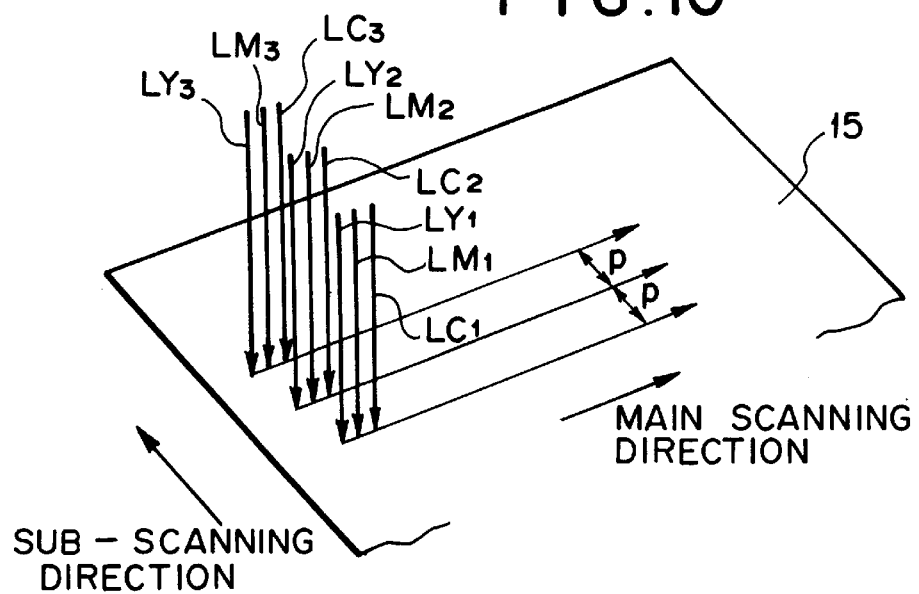
FIG. 10 is a schematic view for illustrating simultaneous recording along a plurality of main scanning lines in the light beam scanning recording device.

The magnification x in the sub-scanning direction by the collimator lens 41, the cylindrical lens 42 and the imaging optical system 32 may be set to satisfy formula $x=p/d$ wherein d represents the pitch between the laser diodes in each of the laser diode arrays 30C, 30M and 30Y (FIG. 8) and p represents desired spaces between the main scanning lines (FIG. 10).

The laser beams LC, LM and LY running out of an effective main scanning region are reflected by a mirror 38 to impinge upon a starting point sensor 39, which may be a photodiode, as shown in FIGS. 3 and 4. Signals output from the starting point sensor 39 upon detection of the laser beams LC, LM and LY are used to time the main scanning and the sub-scanning.

Figure 7:
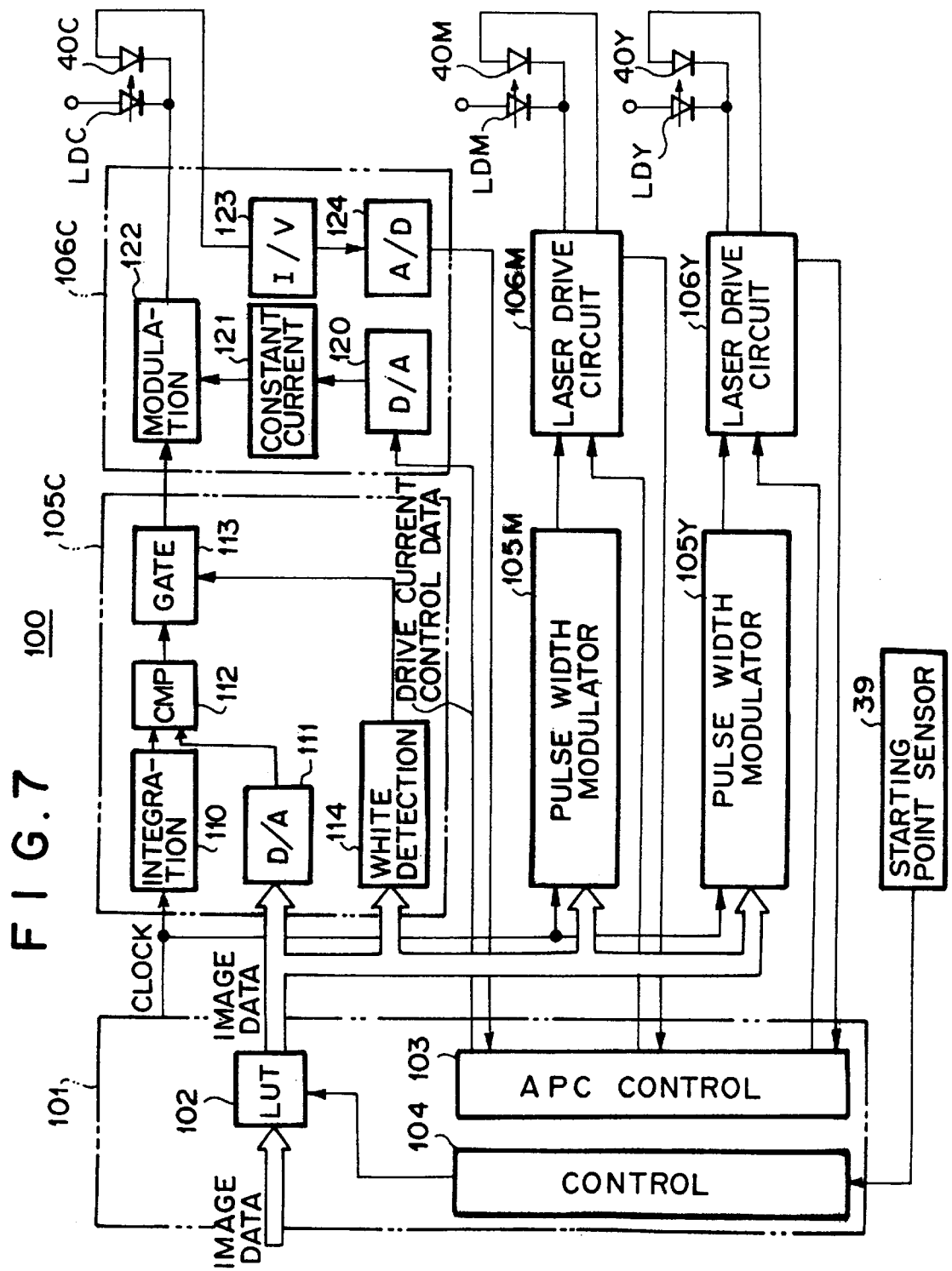
FIG. 7 is a block diagram showing the electric circuit of the light beam scanning recording device.

A control unit 100 which controls the laser diode arrays 30C, 30M and 30Y will be described with reference to FIG. 7, hereinbelow. The control unit 100 has a main control section 101 comprising a microcomputer, memories and the like. The main control section 101 functionally comprises a lookup table (LUT) 102 which converts, for instance, 8-bit image data input thereinto into 12-bit image data for recording, an automatic power control (APC) section 103 for effecting automatic power control to be described later and a control section 104 which controls actions of the lookup table 102 and the automatic power control section 103.

Pulse width modulators 105C, 105M and 105Y which are 3 in number, respectively, are connected to the main control section 101. Each of the pulse width modulators 105C is connected to one of the laser diodes LDC in the laser diode array 30C by way of a laser drive circuit 106C, each of the pulse width modulators 105M is connected to one of the laser diodes LDM in the laser diode array 30M by way of a laser drive circuit 106M, and each of the pulse width modulators 105Y is connected to one of the laser diodes LDY in the laser diode array 30Y by way of a laser drive circuit 106Y. In FIG. 7, only one of the pulse width modulators 105C, 105M and 106Y and one of the laser drive circuits 106C, 106M and 106Y are shown.

The pulse width modulator 105C has an integrator 110 and a D/A convertor 111. Clock signals output from the main control section 101 picture element by picture element are input into the integrator 110 and 12-bit image data output from the lookup table 102 are input into the D/A convertor 111. The output end of the integrator 110 is connected to one of a pair of input ends of a comparator (CMP) 112, and triangular signals obtained by integrating the clock signals are input into the comparator 112 from the integrator 110. The output end of the D/A convertor 111 is connected to the other input end of the comparator 112 and an analog signal corresponding to the image data is input into the comparator 112 from the D/A convertor 111.

The comparator 112 compares the levels of the two signals input thereinto with each other and outputs a high level signal when the level of the signal from the integrator 110 exceeds the level of the signal from the D/A convertor 111. The output end of the comparator 112 is connected to a gate circuit 113 and the output end of the gate circuit 113 is connected to the laser drive circuit 106C. Accordingly signals whose pulse width is modulated according to the value of the image data for each picture element, i.e., the image density are input into the laser drive circuit 106C through the gate circuit 113.

The lookup table 102 outputs three pieces of 12-bit image data corresponding to input image data of the respective colors. The three pieces of image data representing the density of cyan are input into three pulse width modulators 105C in sequence at predetermined timings. That is, when image data for a (3i+1)-th main scanning line (i standing for 0, 1, 2, 3 . . . ) as numbered in the sub-scanning direction is input into first one of the three pulse width modulators 105C, image data for a (3i+2)-th main scanning line and a (3i+3)-th main scanning line are input into second and third of the three pulse width modulators 105C. This is the same with image data representing the density of magenta and the pulse width modulators 105M and with image data representing the density of yellow and the pulse width modulators 105Y.

Each of the pulse width modulators 105C is provided with a white detecting circuit 114 and the image data from the lookup table 102 is also input into the white detecting circuit 114. The white detecting circuit 114 detects image data corresponding to white in the input image data and outputs a signal which causes the gate of the gate circuit 113 to close during a period the image data corresponding to white is output from the comparator 112, whereby the pulse signal output from the gate circuit 113 is turned low during the period and the pulse corresponding to white is removed.

Since the pulse width modulators 105M and 105Y are the same as the pulse width modulator 105C in structure, they will not be described here.

The laser drive circuit 106C is provided with a D/A convertor 120. The D/A convertor 120 is connected to the automatic power control section 103 in the main control section 101, and digital drive current control data representing the level of the drive current for the laser diode array 30C is input into the D/A convertor 120 from the automatic power control section 103. The D/A convertor 120 converts the input drive current control data into an analog signal and inputs it into a constant-current circuit 121. The constant-current circuit 121 outputs drive current at a constant level according to the level of the input analog signal.

The drive current output from the constant-current circuit 121 is input into a modulator 122. The modulator 122 is connected to the pulse width modulator 105C and the laser diode array 30C. The modulator 122 changes the value of the drive current according to the width of the pulse signal input from the pulse width modulator 105C and supplies the thus modulated drive current to the laser diode array 30C. Photodetectors 40C (e.g., photodiodes) for detecting the intensities of the laser beams LC emitted from the respective laser diodes LDC in the laser diode array 30C are provided integrally with or separately from the corresponding laser diodes LDC. The output current of the photodetector 40C is input into a current-voltage convertor 123 in the laser drive circuit 106C. The current-voltage convertor 123 converts an input current signal into a voltage signal and inputs it into an A/D convertor 124. The A/D convertor 124 converts the input analog voltage signal into a digital signal and inputs it into the automatic power control section 103.

The laser drive circuits 106M and 106Y are the same as the laser drive circuit 106C in structure and accordingly will not be described here. The laser diodes LDM and LDY in the laser diode arrays 30M and 30Y are respectively provided with photodetectors 40M and 40Y the same as the photodetector 40C described above and the output currents of the photodetectors 40M and 40Y are respectively input into the laser drive circuits 106M and 106Y.

As shown in FIG. 5, a switchback section 50 is provided beside the exposure station 25 and a water application section 51 is provided below the exposure station 25. The photosensitive material 15 conveyed to the exposure station 25 from the magazine 14 and exposed to light there is once conveyed into the switchback section 50 and then conveyed to the water application section 51 by reverse of the conveyor rollers 23. Water is supplied to the water application station 51 through a plurality of pipes. The photosensitive material 15 applied with water is conveyed to a heat development/transfer section 52 disposed beside the water application section 51.

A roll of an image receiving material 54 is contained in an image receiving material magazine 53 disposed beside the photosensitive material magazine 14 in the housing 11. The image forming surface of the image receiving material 54 is applied with dye fixing agent containing therein mordant. The image receiving material 54 is drawn out from the magazine 53 at a lower part thereof with its image receiving surface faced upward.

The image receiving material magazine 53 as well as the photosensitive material magazine 14 comprises a body portion and a pair of side frames fixed to the body portion at opposite ends of the body portion and can be taken out from the housing 11 by pulling forward of the housing 11 (in the direction of width of the roll of the image receiving material 54).

The magazine 53 is provided with a mark such as bar codes, a notch, a projection or the like according to the kind and/or lot of the image receiving material 54 contained therein, and an image receiving material sensor 55 provided in a magazine chamber 10B detects the mark. The image receiving material sensor 55 is connected to the aforesaid general control unit and the general control unit determines whether an image receiving material magazine 53 has been loaded and the kind and the lot of the image receiving material 54 contained in the magazine 53 on the basis of signals from the sensor 55.

A pair of nip rollers 56 and a cutter 57 are disposed near the exit slit of the magazine 53 and the image receiving material 54 is drawn out from the magazine 53 by the nip rollers 56 and cut in a predetermined length by the cutter 57. An image receiving material conveyor 58 comprising a plurality of conveyor rollers 59, 60 and 80 and a guide plate 81 is provided to convey the image receiving material 54 cut in the predetermined length to the heat development/transfer section 52.

The photosensitive material 15 conveyed to the heat development/transfer section 52 is fed between a laminating roller 61 and a heating drum 62. The image receiving material 54 is conveyed in synchronization with conveyance of the photosensitive material 15 with the leading end of the image receiving material 54 behind the leading end of the photosensitive material 15 by a predetermined length and fed between the laminating roller 61 and the heating drum 62, whereby the image receiving material 54 is superimposed on the photosensitive material 15.

A pair of halogen lamps 63 and 64 are disposed inside the heating drum 62 to heat the outer surface of the heating drum 62. Five rollers 65 to 69 are disposed around the heating drum 62 and an endless pressure belt 70 is passed around the rollers 65 to 69. The pressure belt 70 is pressed against the outer peripheral surface of the heating drum 62.

A flexible guide roller 71 and a stripper claw 72 are disposed in this order in the conveying direction of the pressure belt 70 near the heating drum 62 on the downstream side. The stripper claw 72 is supported to be swung about a pivot pin 72A and is driven by a cam 73. A photosensitive material discarding system 77 comprising known rollers and guide plates is disposed below the stripper claw 72 and conveys the photosensitive material 15 stripped off the heating drum 62 to a discarding box 76.

A stripper roller 74 and a stripper claw 75 for stripping the image receiving material 54 off the heating drum 62 are disposed beside the flexible roller 71 in this order in the conveying direction. An image receiving material conveyor system 79 comprising known rollers and guide plates is disposed below the stripper roller 74 and the stripper claw 75 and conveys the image receiving material 54 stripped off the heating drum 62 to a tray 78.

The operation of the light beam scanning recording system 10 of this embodiment will be described hereinbelow. Before recording an image, a color alignment correction is effected. That is, when the laser diode arrays 30C, 30M and 30Y are simultaneously operated, the beam spots of the laser beams LC, LM and LY on the photosensitive material 15 cannot be correctly aligned with each other in the main scanning direction due to difference in the optical paths of the laser beams LC, LM and LY. The color alignment correction is for causing the beam spots of the laser beams LC, LM and LY on the photosensitive material 15 to correctly coincide with each other. That is, the laser diode arrays 30C, 30M and 30Y are operated in sequence at predetermined intervals. This is effected by shifting the phases of the clock signals input into the respective pulse width modulators 105C, 105M and 105Y from each other according to shift in time between the detecting signals of the laser beams LC, LM and LY input into the control section 104 from the starting point sensor 39.

Detailed method of the color alignment correction is disclosed in Japanese Unexamined Patent Publication No. 7(1995)-5591.

When recording start instruction is input into the general control unit, the nip rollers 17 are operated to draw out the photosensitive material 15 from the magazine 14 and then the cutter 18 is operated to cut the photosensitive material 15 in a predetermined length.

The photosensitive material 15 cut in the predetermined length is fed into the exposure station 25 by the conveyor rollers 19 and the like with its photosensitive surface faced upward. Then the laser scanning unit 26 is operated in synchronization with the conveyor rollers 21 and 22 which double as a sub-scanning means and the photosensitive material 15 is exposed to laser beams emitted from the laser scanning unit 26. Exposure of the photosensitive material 15 to the laser beams will be described in detail with reference to FIGS. 3, 4 and 7, hereinbelow.

When the starting point sensor 39 detects the laser beams LC, LM and LY and the output signals of the starting point sensor 39 are input into the automatic power control section 103, an automatic power control is performed. The automatic power control is for controlling the drive current for each of the laser diodes in the laser diode arrays 30C, 30M and 30Y so that a predetermined output is obtained for a given image data. That is, upon receipt of the output signals from the starting point sensor 39, the automatic power control section 103 once turns off the laser diodes in the laser diode arrays 30C, 30M and 30Y and then turns on the laser diodes for a predetermined time, which is short (e.g., 100 μsec), on the basis of a drive current control data representing target values of output powers. The automatic power control section 103 takes outputs of the photodetectors 40C, 40M and 40Y each three in number at the time the laser diodes are turned on and changes the values in the drive current control data so that the output powers of the laser diodes represented by the outputs of the photodetectors 40C, 40M and 40Y converge on the target values.

The automatic power control is performed each time the starting point sensor 39 detects the laser beams LC, LM and LY, and three main scanning lines are exposed during intervals. That is, three pieces of recording image data for three main scanning lines are supplied to the pulse width modulators 105C, 105M and 105Y each three in number, and the pulse width modulators 105C, 105M and 105Y generate signals pulse-width-modulated according to image data for each picture element and input the pulse-width-modulated signals to the respective laser drive circuits 106C, 106M and 106Y. The laser drive circuits 106C, 106M and 106Y modulate the laser drive currents according to the input pulse-width-modulated signals and supply them to the laser diodes in the laser diode arrays 30C, 30M and 30Y.

In this manner, the intensities of three sets of the laser beams (LC1, LM1 and LY1), (LC2, LM2 and LY2) and (LC3, LM3 and LY3) are modulated according to the image data for each picture element and since the three sets of the laser beams (LC1, LM1 and LY1), (LC2, LM2 and LY2) and (LC3, LM3 and LY3) thus modulated scan the photosensitive material 15 along three different main scanning lines, recording is effected for three main scanning lines at one time. Further since the photosensitive material 15 is conveyed in the sub-scanning direction in synchronization with the main scanning, the photosensitive material 15 is two-dimensionally exposed to the laser beams LC, LM and LY.

The conveyor rollers 23 start to rotate in response to start of exposure by the laser scanning unit 26 and once feed the photosensitive material 15 to the switchback portion 50. When recording is ended and the rear end of the photosensitive material 15 is moved away from the conveyor rollers 22, the conveyor rollers 23 are reversed to feed the photosensitive material 15 to the water application section 51.

In the water application station, the photosensitive material 15 is applied with water as a solvent for image forming and then passed through the water application section 51 with excessive water removed by squeeze rollers 82. Then the photosensitive material 15 is fed to the heat development/transfer section 52 by the squeeze rollers 82.

Further the image receiving material 54 is drawn out from the magazine 53 by the nip rollers 56 in response to start of exposure and then cut by the cutter 57 in a predetermined length. The image receiving material 54 is conveyed by the image receiving material conveyor system 58 to a position just short of the heat development/transfer section 52 and waits there.

When it is detected that the photosensitive material 15 is fed between the laminating roller 61 and the heating drum 62 by the squeeze rollers 82, the image receiving material conveyor system 58 resumes conveying the photosensitive material 15 to convey the photosensitive material 15 to the laminating roller 61 and at the same time the heating drum 62 starts to rotate in the counterclockwise direction in FIG. 5.

A guide plate 83 is disposed between the laminating roller 61 and the squeeze rollers 82 to guide the photosensitive material 15 to the laminating roller 61.

The photosensitive material 15 and the image receiving material 54 superimposed by the laminating roller 61 are conveyed over about two thirds of the circumference of the heating drum 62 (from the roller 65 to the roller 69) sandwiched between the heating drum 62 and the pressure belt 70, whereby the photosensitive material 15 and the image receiving material 54 are heated and movable dye is transferred from the photosensitive material 15 to the dye fixing layer on the image receiving material 54 to form a color image.

When the photosensitive material 15 and the image receiving material 54 reach the lower side, the stripper claw 72 is actuated by the cam 73 and engages with the leading end of the photosensitive material 15 which is conveyed forward of the image receiving material 54 to strip the photosensitive material 15 off the heating drum 62. In response to return of the stripper claw 72, a pinch roller (not shown) pushes the photosensitive material 15 and the photosensitive material 15 is passed around the guide roller 71, whereby the photosensitive material 15 is moved downward. Further the photosensitive material 15 is conveyed by the photosensitive material discarding system 77 to the discarding box 76 while dried by a dryer system (not shown).

On the other hand, the image receiving material 54 separated from the photosensitive material 15 and conveyed on the heating drum 62 is stripped off the heating drum 62 by the stripper claw 75 actuated by the cam 73 and is moved downward by the stripper roller 74. Then the image receiving material 54 is conveyed to the tray 78 by the image receiving material conveyor system 79 while dried by a dryer system (not shown).

In the light beam scanning recording device 10 of this embodiment, since recording is effected along three main scanning lines at one time, the recording speed can be kept relatively high even if the main scanning speed is lowered. When the main scanning speed is low, recording time for one picture element can be long, whereby the amount of light applied to each picture element can be increased and the dynamic range can be widened so that a high quality color image can be recorded.

Further when the main scanning speed is low, the polygonal mirror 43 for causing the light beams to scan the recording material 15 in the main scanning direction need not be driven at a high speed and at the same time the modulators need not respond at a high speed, which makes it feasible to manufacture the laser beam scanning recording device 10 at relatively low cost.

Though the main scanning lines become oblique with respect to the direction of the sub-scanning when the photosensitive material 15 is continuously conveyed, the main scanning lines can be normal to the direction of the sub-scanning when the photosensitive material 15 is conveyed intermittently in synchronization with the main scanning.

When the laser diode arrays 30C, 30M and 30Y in the light source are obliquely arranged as shown in FIG. 11, the pitch d between the laser diode arrays can be reduced and a higher density recording can be realized for a given optical magnification.

Further in place of the laser diode array such as a surface-emitting laser array, an LED array can be used as the light source. Further instead of using three linear laser diode arrays 30C, 30M and 30Y as in the embodiment described above, a two-dimensional laser diode array in which laser diodes of different colors are arranged in the sub-scanning direction and laser diodes of the same colors are arranged in the main scanning direction may be used. Otherwise, a plurality of separate light sources may be arranged to form a two-dimensional array.

Further it is possible to arrange the light beam scanning recording device of this embodiment to record along two or four or more main scanning lines at one time.

What is claimed is:

1. A light beam scanning recording device for recording a color image on a recording material conveyed in a sub-scanning direction by scanning the recording material in a main scanning direction and in the sub-scanning direction with light beams of a plurality of different wavelengths modulated according to an image signal, said device comprising:

a light source which emits a plurality of first light beams having different wavelengths, said first light beams forming first beam spots that scan across the recording material along a first main scanning line, said light source emitting, simultaneously with said first light beams, a plurality of second light beams having different wavelengths, said second light beams forming second beam spots that scan across the recording material along a second main scanning line which is displaced from said first main scanning line in the sub-scanning direction.

2. A light beam scanning recording device as defined in claim 1, wherein said first light beams are focused on the recording material side by side in the main scanning direction during scanning along the first main scanning line, and wherein said second light beams are focused on the recording material side by side in the main scanning direction during scanning along the second main scanning line.

3. A light beam scanning recording device as defined in claim 1, wherein said first beam spots are focussed on one point and said second beam spots are focussed on another point.

4. A light beam scanning recording device as defined in claim 1, wherein said light source is a laser diode array.

5. A light beam scanning recording device as defined in claim 1, further comprising a condenser optical system disposed between the light source and the recording material, said condenser optical system magnifying in the sub-scanning direction, by a magnification x, said first and second light beams, said light source comprising first light emitting portions for emitting said first light beams and second light emitting portions for emitting said second light beams, ones of the first light emitting portions and ones of the second light emitting portions which emit light beams of the same wavelengths being spaced at a pitch d, wherein desired spaces p between the first and second main scanning lines on the recording material satisfy a formula $x=p/d$.

6. The light beam scanning recording device as defined in claim 1, wherein said light source emits, simultaneously with said first and second light beams, a plurality of third light beams having different wavelengths, said third light beams forming third beam spots that scan across the recording material along a third main scanning line which is displaced from said first and second main scanning lines in the sub-scanning direction.

7. A light beam scanning recording method for recording a color image on a recording material conveyed in a sub-scanning direction, comprising the steps of:

scanning first light beams having different wavelengths across the recording material along a first main scanning line which is substantially perpendicular to said sub-scanning direction;

simultaneously with said scanning of the first light beams, scanning second light beams having different wavelengths across the recording material along a second main scanning line which is substantially perpendicular to said sub-scanning direction and which is displaced from said first main scanning line in the sub-scanning direction.

8. The light beam scanning recording method as defined in claim 7, further comprising the steps of:

focussing the first light beams side-by-side on the recording material along the first main scanning line; and focussing the second light beams side-by-side on the recording material along the second main scanning line.

9. The light beam scanning recording method as defined in claim 7, further comprising the steps of:

focussing the first light beams on the recording material to be at least partially overlapping;

focussing the second light beams on the recording material to be at least partially overlapping.

10. The light beam scanning recording method as defined in claim 7, further comprising the step of:

simultaneously with said scanning of the first light beams and said scanning of the second light beams, scanning third light beams having different wavelengths across the recording material along a third main scanning line which is substantially perpendicular to said sub-scanning direction and which is displaced from said first and second main scanning lines in the sub-scanning direction.

* * * * *